Aug. 14, 1928.

E. EASTHOPE

STUMP PULLING ENGINE

Filed Aug. 17, 1926 — 2 Sheets-Sheet 1

Ernest Easthope
Inventor
by P. L. Boyden
Attorney

Aug. 14, 1928.

E. EASTHOPE 1,680,939

STUMP PULLING ENGINE

Filed Aug. 17, 1926    2 Sheets-Sheet 2

Ernest Easthope
Inventor
by F. L. Boyden
Attorney

Patented Aug. 14, 1928.

1,680,939

UNITED STATES PATENT OFFICE.

ERNEST EASTHOPE, OF VANCOUVER, BRITISH COLUMBIA, CANADA.

STUMP-PULLING ENGINE.

Application filed August 17, 1926. Serial No. 129,772.

This invention relates to a stump pulling engine and consists in the combination of a gasoline engine mounted in conjunction with shafts, gear wheels, drums and other necessary gear to effect the purposes of the device.

The objects in view with the invention are to provide in a very compact form all the necessary apparatus to efficiently and rapidly dispose of the work involved in the extraction of tree stumps and to effect this duty at a minimum of expense, either of plant, time or fuel.

In carrying out these objects I adopt a novel method of arrangement of the plant in which my cross shafts, which of necessity are very substantial in order to take care of the heavy stresses involved, are utilized as cross members of the bed plates, their additional function being merely to support the drums and gearing which revolve upon them. By this arrangement the weight of the base plate is much reduced and the cost of keys and keyways eliminated with no corresponding disadvantages, but rather a simplification of the parts throughout.

Figure 1:
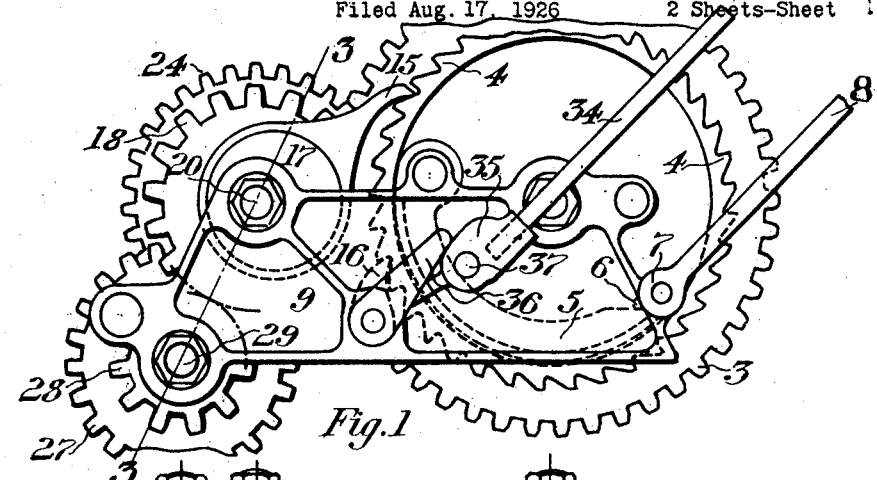
Figure 2:
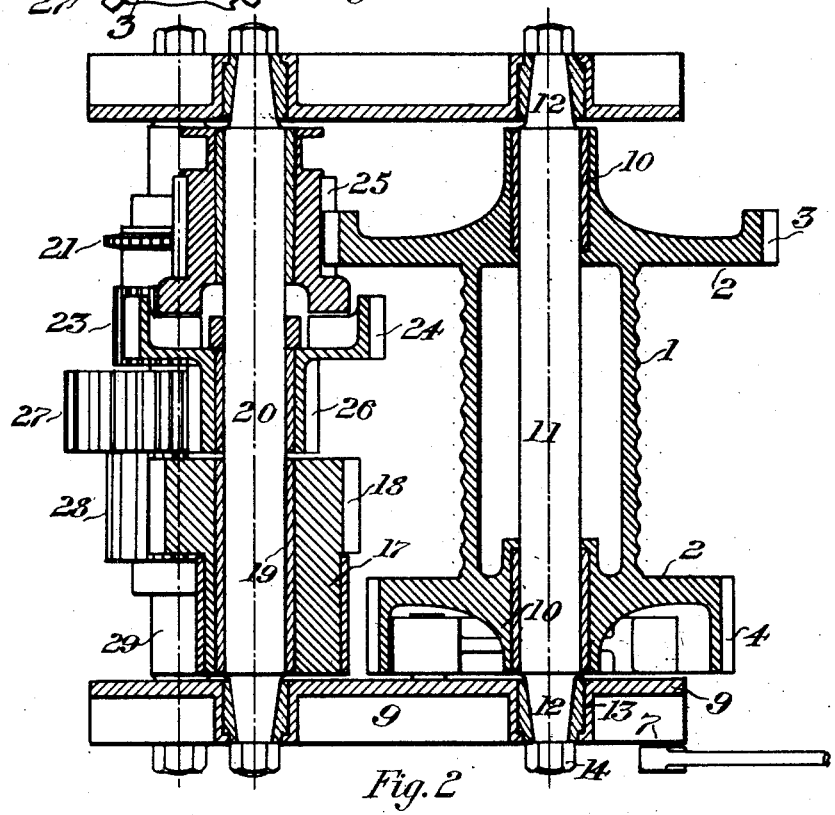
Figure 4:
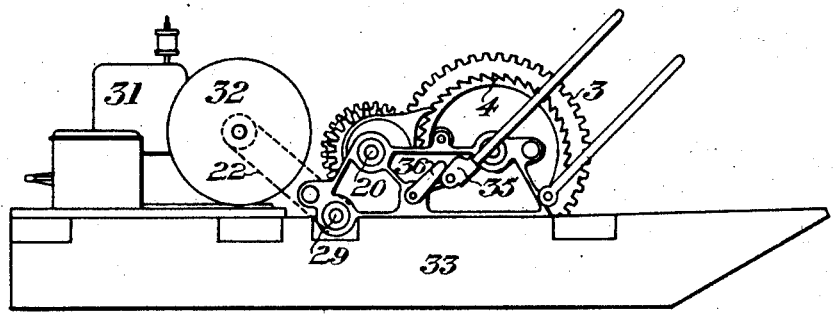
Figure 3:
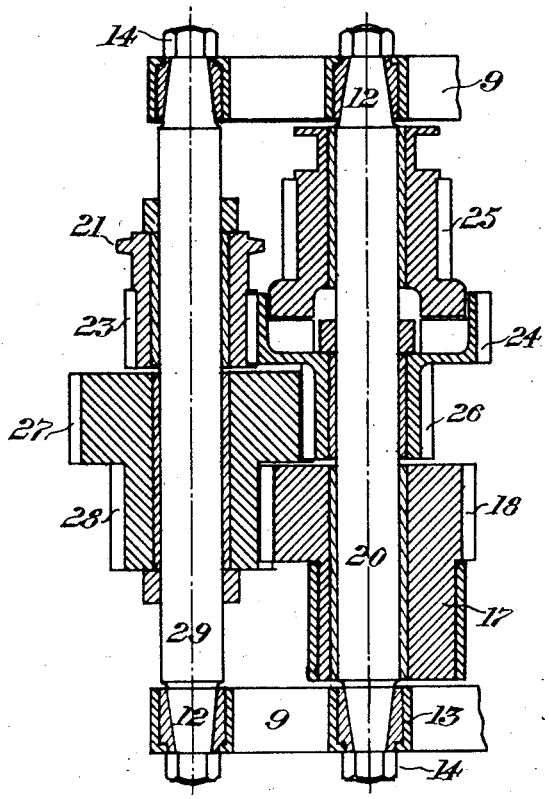

Further novelties and details are more clearly observed from the drawings herewith, which form part of this application and in which Fig. 1 is a side elevation; Fig. 2, a plan view largely in section horizontally; Fig. 3 being a cross section on line 3—3 of Fig. 1 and showing the connections of the lower shaft; Fig. 4 is a general elevation showing the disposition of the plant as mounted for work upon a wood truck or sled.

The winding drum (1) has a grooved barrel as shown, its flanges (2) being formed into the spur wheel (3) and the ratchet wheel (4). The inner periphery of the latter is made use of for the brake, the shoe of which is shown at (5) and the cam and fulcrum at (6) and (7) respectively, (8) being the brake lever which is carried by a projecting boss on the side frame (9).

Thus the main drum with its flanges extended to form the bearings (10) together with the two spur wheels are integral, saving considerable space and workmanship. The shaft member (11) with the coned ends (12) is firmly secured to the side frames (9) through the babbitt box (13) and the exterior nuts (14).

The main ratchet wheel (4) is propelled by the intermittent motion of the eccentrically driven pawl (15), the motion of the drum being locked by the action of the dog (16) which supports the ratchet as shown in Fig. 1, whilst the pivot is making the following stroke.

The pawl (15) is formed from an extension of the strap of the eccentric (17) which is integral with the spur wheel (18) and revolves on the long bearing (19) upon the fixed countershaft or cross-stay (20).

The extreme compactness and simplicity of this compound gear is more clearly seen from an inspection of Fig. 3, where the advantages arising from utilizing the cross-stays of the frame as fixed supports for the revolving gear members is apparent, and in which (21) is a sprocket wheel directly driven from the engine by the chain (22). This wheel being integral with the pinion (23) drives the jaw-clutch spur wheel (24) with which it meshes, this latter being engageable with the sliding pinion (25) and in Fig. 3 shown out of gear.

The spur wheel (24) is integral with the pinion (26) driving the spur wheel (27), the latter being integral with the pinion (28) which meshes with the gear forming part of the eccentric sheave (17). Thus on the lower cross-stay (29) there are four different gears and on the cross-stay (20) five gears, making an arrangement uniting a maximum of power with a minimum of space. In every instance the gears revolve on babbitted bearings around the fixed cross-stay.

In the general view, Fig. 4, (31) is the gasoline engine block, (32) being the fly wheel, (33) the base upon which the entire plant is mounted.

Should it be necessary to disengage the dog (16) whilst under strain, provision is made for this by the external lever (34) in connection with the cam (35) of the dog lever (36), the fulcrum (37) being obtained by a stud carried in the side of the frame (9).

Having now particularly described my invention, what I claim is:—

In a power driven stump puller device the combination comprising, side frames entirely supporting the said device, the said frames being secured to and united by cross-stays, a winding drum revolving upon one of said cross-stays, a ratchet wheel integral with said drum, a pawl engaging said ratchet wheel, an eccentric revolving on a second cross-stay and having a spur wheel integral therewith, a strap for the eccentric provided with an extension forming the said pawl, the spur wheel integral with said eccentric engaging a pinion on a third cross-stay, a spur wheel integral with the last said pinion and engaging a pinion on the second cross-stay, the last said pinion being integral with a spur wheel and carrying an internally positioned claw clutch, a pinion on the second said stay and provided with a clutch face corresponding to that on the last said spur wheel, a second spur wheel integral with the said drum and engaging the last named pinion on the second cross-stay, a second pinion on the said third cross-stay meshing with the spur wheel on the second cross-stay having the claw clutch, the second said pinion on the said third cross-stay being integral with a sprocket wheel driven by the power unit.

In testimony whereof I affix my signature.

ERNEST EASTHOPE.